(12) United States Patent
de Lucia

(10) Patent No.: US 12,084,219 B2
(45) Date of Patent: Sep. 10, 2024

(54) CONTAINER FOR FOOD PRODUCTS AND METHOD TO MANUFACTURE IT

(71) Applicant: SIROPACK ITALIA S.R.L., Cesenatico (IT)

(72) Inventor: Rocco de Lucia, Cesena (IT)

(73) Assignee: SIROPACK ITALIA S.R.L., Cesenatico (IT)

( * ) Notice: Subject to any disclaimer, the term of this patent is extended or adjusted under 35 U.S.C. 154(b) by 216 days.

(21) Appl. No.: 17/603,377

(22) PCT Filed: Apr. 17, 2020

(86) PCT No.: PCT/IB2020/053663
§ 371 (c)(1),
(2) Date: Oct. 13, 2021

(87) PCT Pub. No.: WO2020/212933
PCT Pub. Date: Oct. 22, 2020

(65) Prior Publication Data
US 2022/0177168 A1    Jun. 9, 2022

(30) Foreign Application Priority Data
Apr. 19, 2019  (IT) .......................... 102019000006142

(51) Int. Cl.
*B65B 7/28*     (2006.01)
*B29C 65/48*    (2006.01)
(Continued)

(52) U.S. Cl.
CPC ............ *B65B 7/2871* (2013.01); *B29C 65/48* (2013.01); *B65B 51/026* (2013.01); *B65D 77/2024* (2013.01); *B29L 2031/7162* (2013.01)

(58) Field of Classification Search
CPC ..... B65B 7/2871; B65B 51/026; B65B 7/162; B65B 51/02; B65B 55/24; B65B 57/06;
(Continued)

(56) References Cited

U.S. PATENT DOCUMENTS 3,816,973 A * 6/1974 Baker .................. B65B 7/2871
53/376.5
5,779,050 A * 7/1998 Kocher ................. B65B 7/2885
206/497
(Continued)

FOREIGN PATENT DOCUMENTS

CA    2866167 A1 * 9/2013 ......... B29C 65/7867
CZ    28307 U1 * 6/2015 ............... B65D 1/34
(Continued)

OTHER PUBLICATIONS

International Search Report and Written Opinion from International Application No. PCT/IB2020/053663 mailed Jul. 20, 2020.
(Continued)

*Primary Examiner* — Hemant Desai
*Assistant Examiner* — Mobeen Ahmed
(74) *Attorney, Agent, or Firm* — Dorsey & Whitney LLP

(57) ABSTRACT

A container for food products is defined by a tray (2), which is made of a polymer material, has a bottom wall (3), a side wall (4), and an upper peripheral edge (5), and is provided with a glue layer (16) directly applied on the polymer material of the upper peripheral edge (5) to lock a closing lid (6) on the upper peripheral edge (5).

11 Claims, 6 Drawing Sheets

(51) Int. Cl.
  *B65B 51/02* (2006.01)
  *B65D 77/20* (2006.01)
  *B29L 31/00* (2006.01)

(58) Field of Classification Search
  CPC ... B65B 61/00; B65B 47/00–10; B29C 65/48; B65D 77/2024; B29L 2031/7162
  See application file for complete search history.

(56) References Cited

U.S. PATENT DOCUMENTS

| | | | | |
|---|---|---|---|---|
| 5,916,615 | A * | 6/1999 | Brady | B65D 81/24 |
| | | | | 229/123.1 |
| 5,919,547 | A * | 7/1999 | Kocher | B65D 81/20 |
| | | | | 426/127 |
| 6,032,800 | A * | 3/2000 | Kocher | B65D 81/2076 |
| | | | | 426/127 |
| 6,248,380 | B1 * | 6/2001 | Kocher | B32B 27/08 |
| | | | | 426/396 |
| 6,604,342 | B1 * | 8/2003 | Appelbaum | B65B 11/50 |
| | | | | 53/374.8 |
| 6,629,602 | B1 * | 10/2003 | Heyman | A61L 2/07 |
| | | | | 206/484.1 |
| 8,672,166 | B2 * | 3/2014 | Nazareth | B65D 17/401 |
| | | | | 215/256 |
| 10,589,917 | B1 * | 3/2020 | Mir | B65D 77/2024 |
| 2003/0113724 | A1 * | 6/2003 | Schembri | B01L 3/508 |
| | | | | 438/1 |
| 2004/0146602 | A1 * | 7/2004 | Garwood | B65D 81/2076 |
| | | | | 426/35 |
| 2006/0049073 | A1 * | 3/2006 | Shannon | B65D 85/76 |
| | | | | 206/459.5 |
| 2011/0023417 | A1 * | 2/2011 | Finkowski | B65B 47/04 |
| | | | | 53/531 |
| 2015/0096270 | A1 * | 4/2015 | Wilcox | B29C 66/83413 |
| | | | | 53/485 |
| 2019/0352027 | A1 * | 11/2019 | Hunter | B65B 31/04 |
| 2020/0346832 | A1 * | 11/2020 | Eilerts | B65D 77/2024 |
| 2020/0391420 | A1 * | 12/2020 | Lucas, Jr. | B32B 7/12 |
| 2021/0292071 | A1 * | 9/2021 | Schmeing | B65D 77/2024 |
| 2021/0380287 | A1 * | 12/2021 | Candida | B65B 41/06 |
| 2022/0009683 | A1 * | 1/2022 | Lahti | B32B 7/06 |
| 2022/0048673 | A1 * | 2/2022 | Cruz | B65D 1/34 |
| 2023/0079877 | A1 * | 3/2023 | Mir | B65D 81/2076 |
| | | | | 428/34.5 |

FOREIGN PATENT DOCUMENTS

| | | | | |
|---|---|---|---|---|
| EP | 1747880 | A1 * | 1/2007 | B65D 25/14 |
| EP | 2275358 | A2 * | 1/2011 | B29C 65/08 |
| EP | 2361759 | A1 * | 8/2011 | B32B 27/08 |
| EP | 2643438 | A1 | 10/2013 | |
| EP | 2845819 | A1 * | 3/2015 | B65D 1/34 |
| EP | 2643238 | B1 | 5/2016 | |
| EP | 3683168 | A1 * | 7/2020 | B29C 65/48 |
| EP | 3981706 | A1 * | 4/2022 | |
| GB | 1473506 | A | 5/1977 | |
| GB | 2471028 | A * | 12/2010 | B65D 1/34 |
| GB | 2546818 | B | 7/2018 | |
| GB | 2604173 | A * | 8/2022 | B29C 51/08 |
| GB | 2606292 | A * | 11/2022 | B29C 51/26 |
| JP | H03200562 | A | 9/1991 | |
| KR | 101367422 | B1 | 2/2014 | |
| WO | 2012068633 | A1 | 5/2012 | |
| WO | WO-2012069050 | A1 * | 5/2012 | B65D 77/2024 |

OTHER PUBLICATIONS

Notice of Reasons for Refusal for Japanese Application No. 2021-562135 mailed Oct. 3, 2023.

* cited by examiner

CONTAINER FOR FOOD PRODUCTS AND METHOD TO MANUFACTURE IT

CROSS-REFERENCE TO RELATED APPLICATIONS

This patent application is a U.S. National Stage of PCT International Application No. PCT/IB2020/053663 filed on 17 Apr. 2020, which claims priority from Italian Patent Application No. 102019000006142 filed on 19 Apr. 2019, the entire disclosure of each of which is incorporated herein by reference.

TECHNICAL FIELD

The present invention relates to a container for food products.

BACKGROUND ART

In the field of containers for food products, it is known to provide a container comprising a tray having a cup shape to receive at least one food product; and a lid, for example a film, to close the tray.

The tray is delimited by a bottom wall, is further delimited by a side wall closed in a loop around the bottom wall, and has a substantially flat upper peripheral edge.

The lid is fastened to the tray by means of a glue layer applied along the upper peripheral edge.

The tray is manufactured starting from a polymer material sheet, which is separated from a polymer material band unwound from a reel.

To prevent the layers of band, wound around the reel, from adhering to one another, a first face of the band is provided with a layer of non-stick material.

When the band is wound on the reel, the non-stick material applied on the first face of the band comes into contact with a second face of the band and is at least partially transferred onto the second face of the band.

Consequently, when the tray is formed starting from the sheet separated from the band, the non-stick material is also present on the upper peripheral edge.

Known containers for food products of the type described above have some drawbacks, mainly deriving from the fact that the glue layer applied on the upper peripheral edge is applied on the non-stick material. Consequently, the glue layer at least partially detaches from the tray thus compromising the correct closing of the container.

DISCLOSURE OF INVENTION

The object of the present invention is to provide a container for food products that is free of the drawbacks set forth above and that is simple and inexpensive to produce.

According to the present invention, there is provided a container for food products.

The present invention further relates to a method to manufacture a container for food products.

According to the present invention, a method to manufacture a container for food products is provided.

BRIEF DESCRIPTION OF THE DRAWINGS

The present invention will now be described with reference to the accompanying drawings, which illustrate a non-limiting example of embodiment thereof, wherein.

BEST MODE FOR CARRYING OUT THE INVENTION

Figure 1:
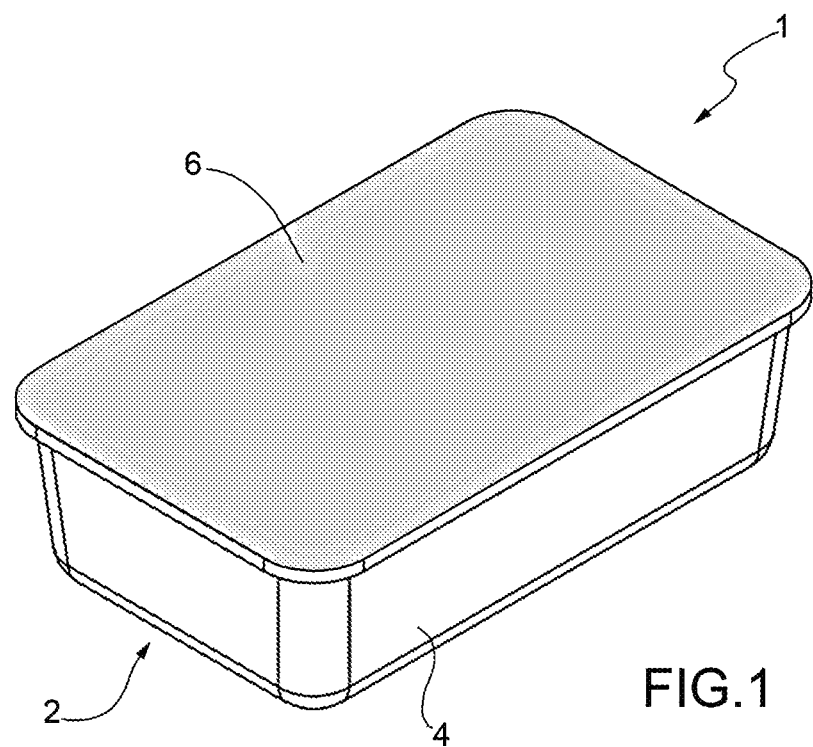
FIG. 1 is a schematic perspective view, with parts removed for clarity, of a preferred embodiment of the container of the present invention.

With reference to FIGS. 1, 2, 3, and 4, the reference number 1 indicates, as a whole, a container for food products comprising a tray 2 of polymer material, which has a cup shape for housing therein at least one food product, is delimited by a bottom wall 3, and is further delimited by a side wall 4 closed in a loop around the wall 3.

The tray 2 has a substantially flat upper peripheral edge 5 obtained along the wall 4, and is sealed by a lid 6, for example a film, glued along the edge 5.

Figure 2:
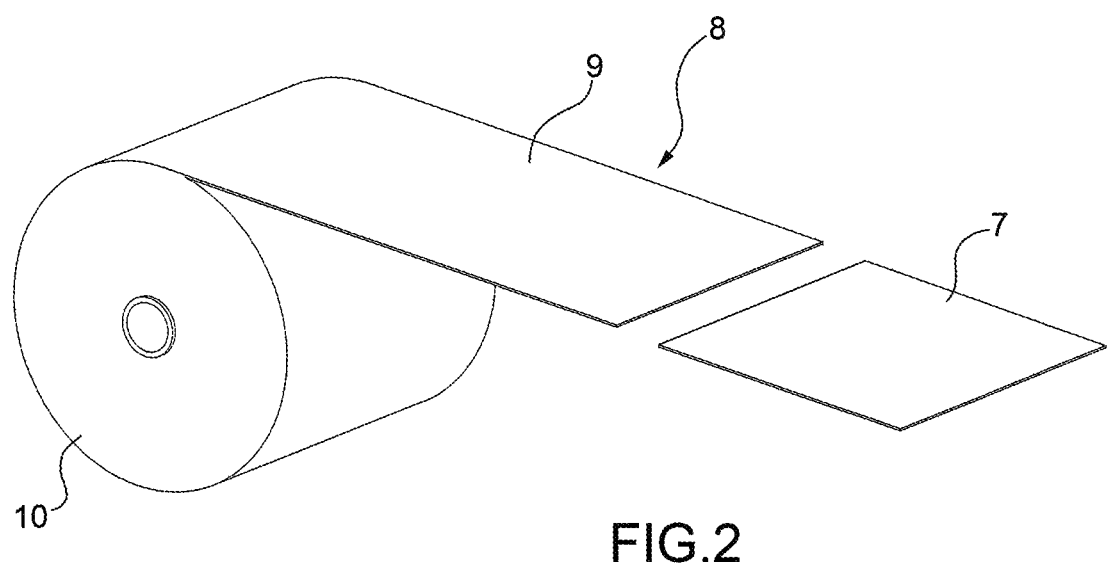
FIGS. 2, 3, and 4 schematically illustrate in perspective view three manufacturing steps of the container of FIG. 1.

The tray 2 is obtained starting from a sheet 7, which is separated from a band 8, which is delimited by two faces 9 opposite to each other (only one of which is illustrated in FIG. 2), and is unwound from a reel 10.

To prevent the layers of band 8, wound around the reel 10, from sticking to one another, the band 8 is provided with a layer of non-stick material (not illustrated) applied on one of the faces 9.

When the band 8 is wound on the reel 10, the layer of non-stick material (not illustrated) applied on one of the faces 9 comes in contact with the other face 9 and is transferred at least partially onto the other face 9.

Once the tray 2 has been formed, the edge 5 is subjected to a superficial treatment to remove a layer 11 of non-stick material present on the edge 5.

Figure 3:
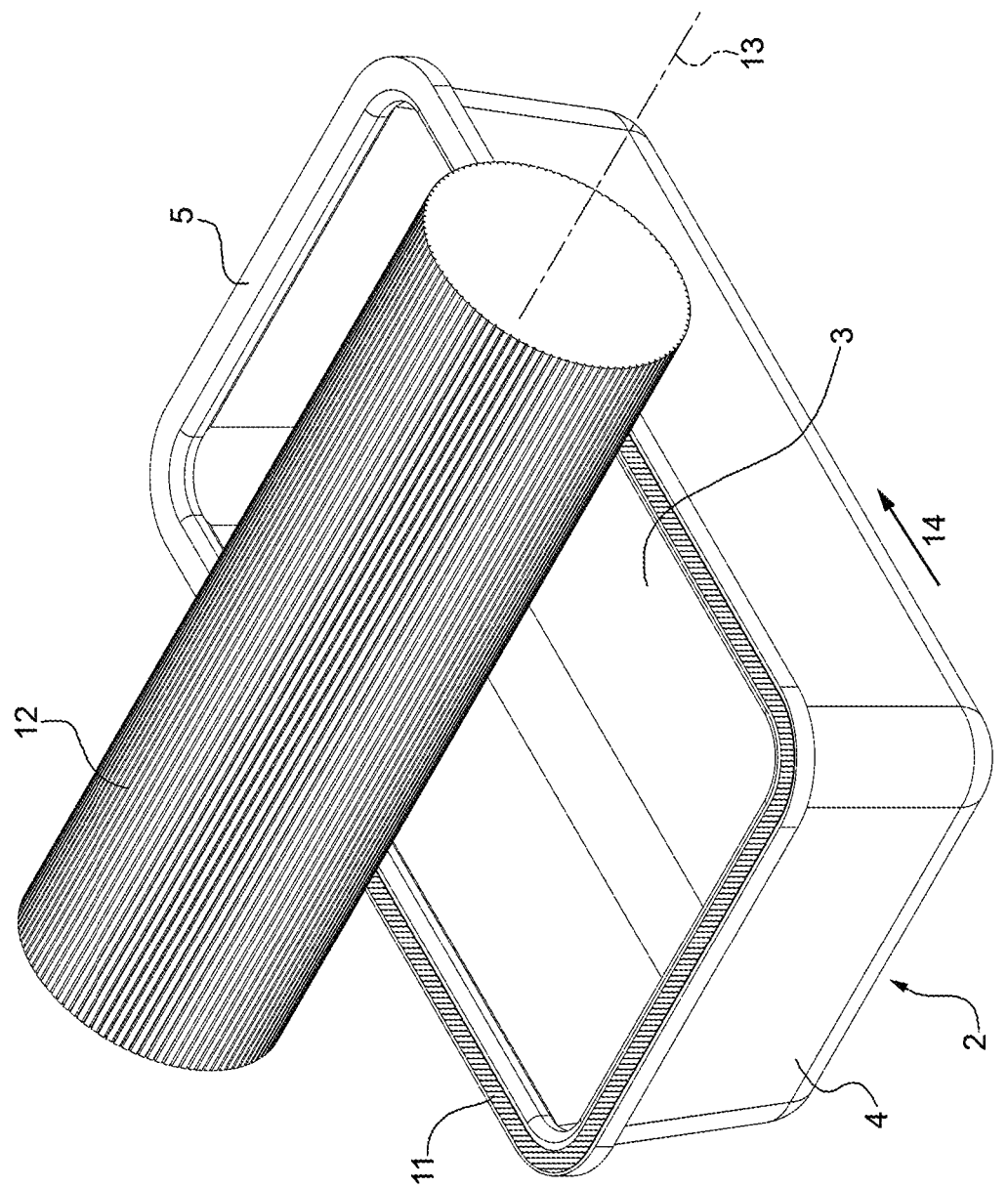

According to what is illustrated in FIG. 3, the layer 11 present on the edge 5 is removed by chip-removal machining, for example a grinding treatment carried out by a grinding roller 12 mounted to rotate about a rotation axis 13 transverse to a feeding direction 14 of the tray 2.

Figure 4:
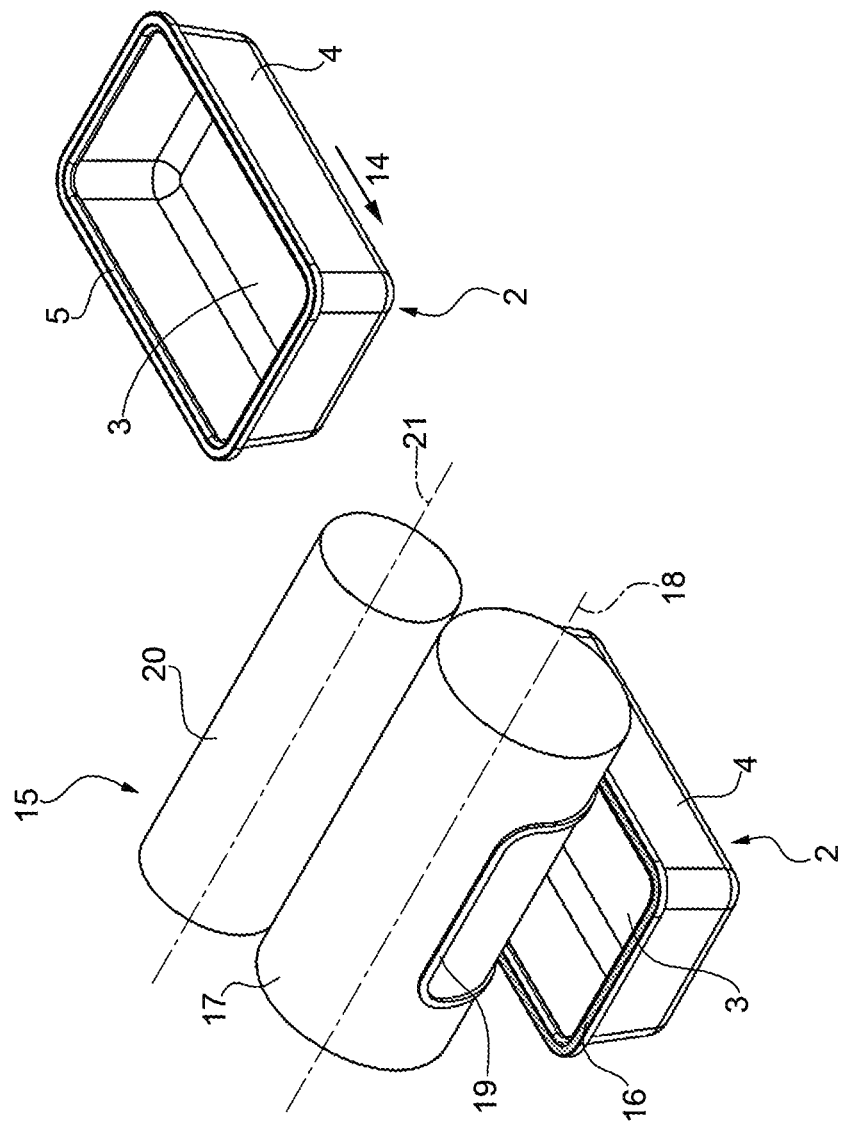

With reference to FIG. 4, after the layer 11 has been removed, the tray 2 is fed through a gluing device 15 designed to apply a glue layer 16 directly on the polymer material of the edge 5 and without interposition of the layer 11.

The layer 16 is applied along the entire perimeter of the edge 5 and on at least part of the width of the edge 5.

The device 15 comprises, in this particular case, a gluing roller 17, which is mounted to rotate about a rotation axis 18 transverse to the direction 14, has a cylindrical side surface provided with an impression 19 corresponding to the profile of the edge 5, and cooperates with a transfer roller 20 mounted to rotate about a rotation axis 21 parallel to the axis 18 and transfer the glue from a storage reservoir (not illustrated) to the roller 17.

Figure 5:
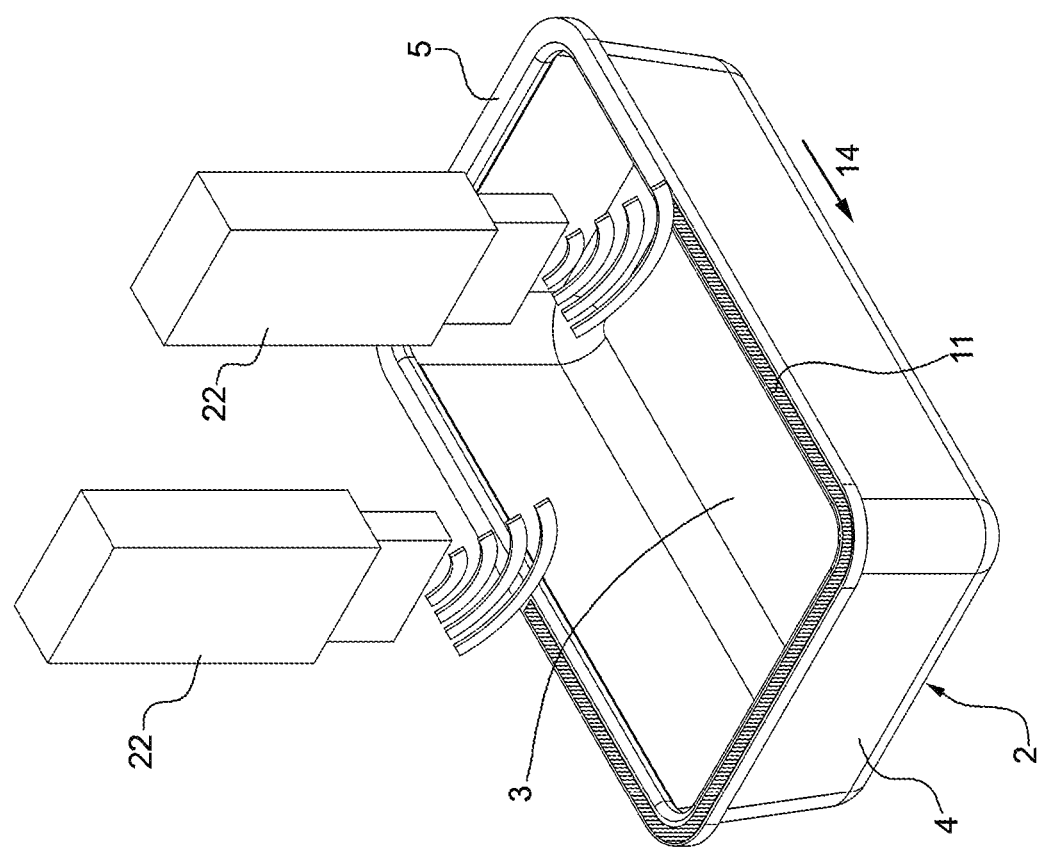
FIGS. 5 and 6 are two schematic perspective views of two variants of the manufacturing step of FIG. 3.

The variant illustrated in FIG. 5 differs from what is illustrated in FIG. 3 purely due to the fact that in this variant the grinding roller 12 is eliminated and replaced with a cleaning device 22 configured to clean the layer 11 from the edge 5 by means of a plasma or corona treatment.

Figure 6:
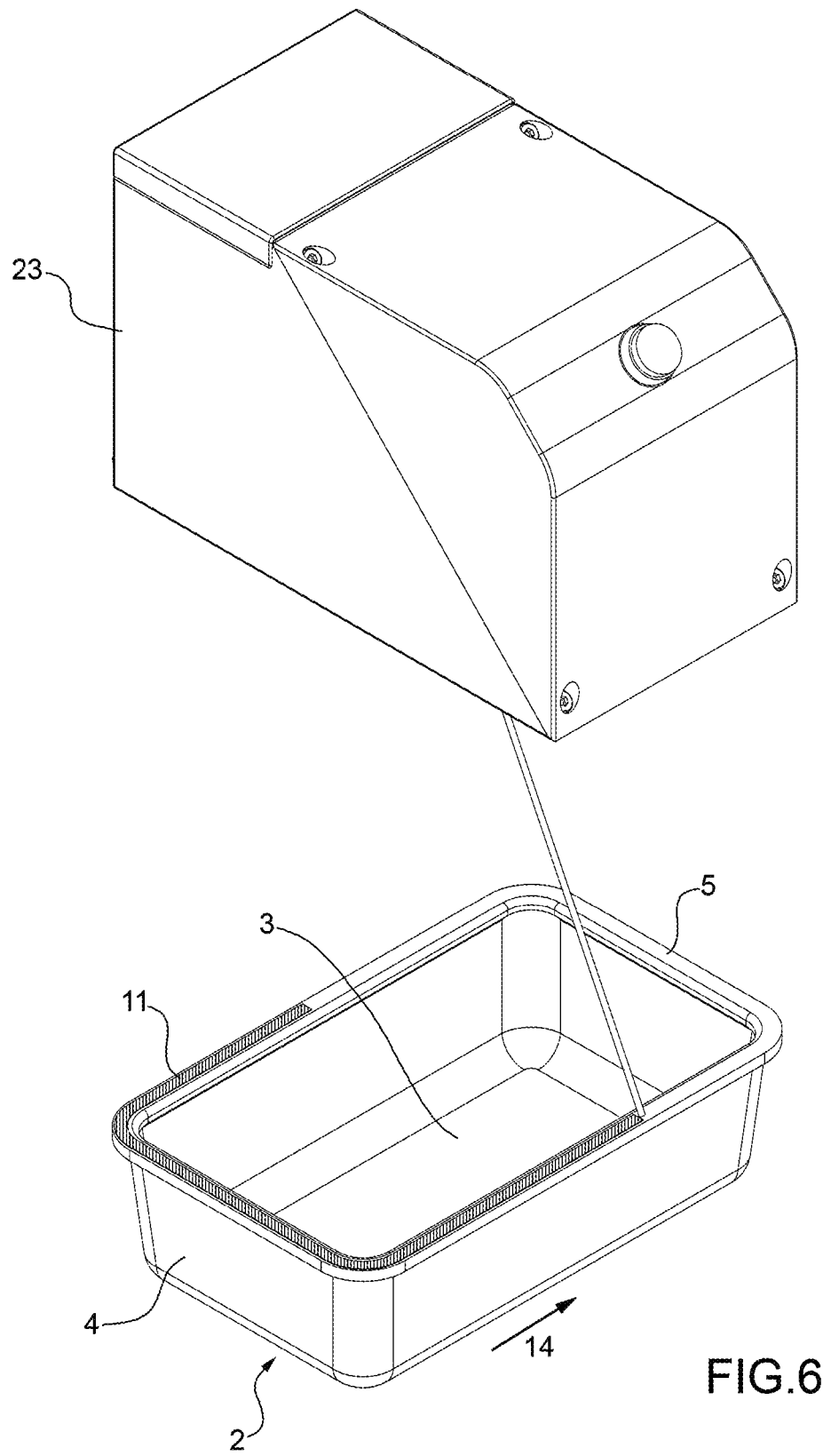

The variant illustrated in FIG. 6 differs from what is illustrated in FIG. 3 purely due to the fact that in this variant the grinding roller 12 is eliminated and replaced with a laser device 23 configured to burn the layer 11 applied on the edge 5.

Figure 7:
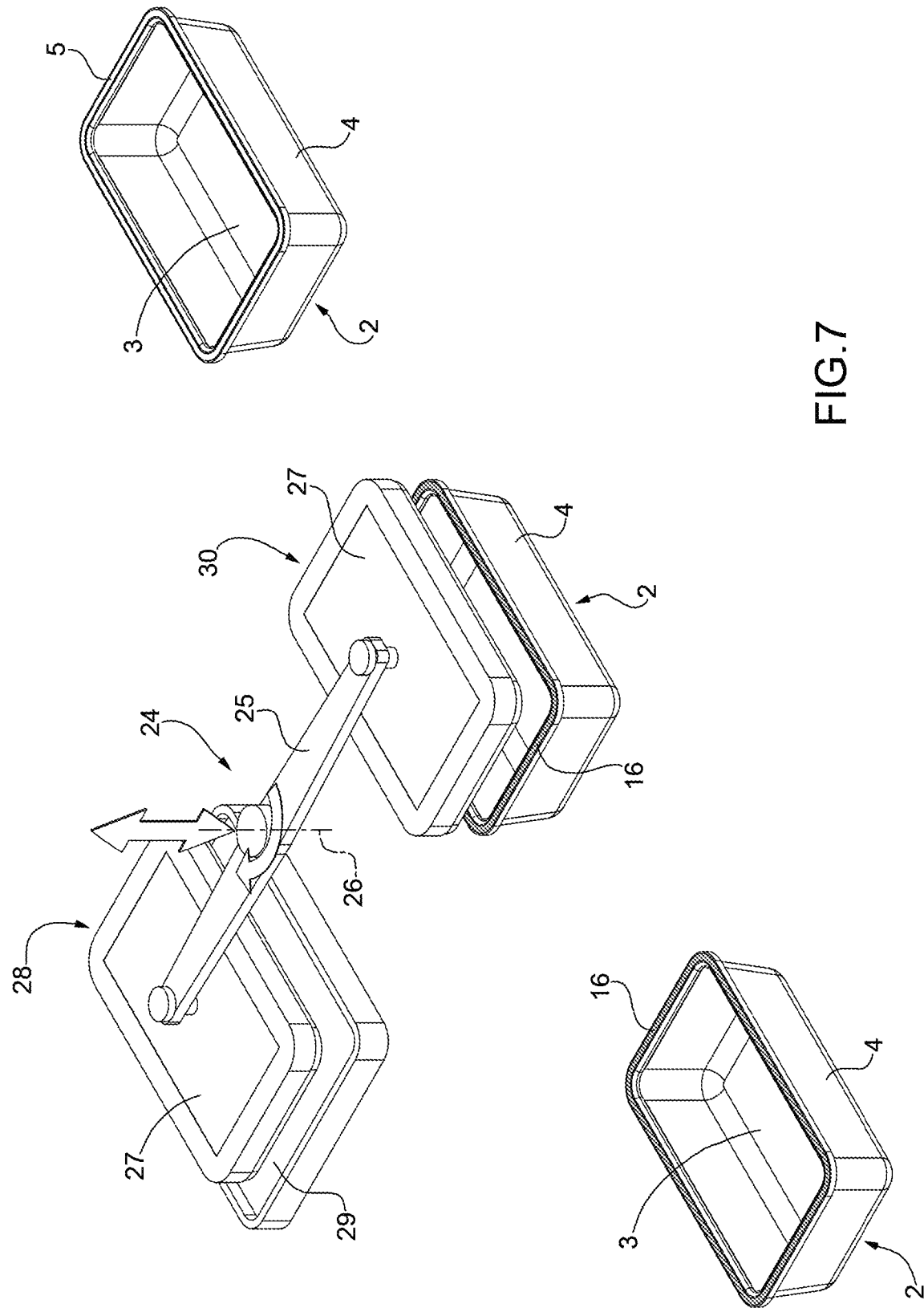
FIG. 7 is a schematic perspective view of a variant of the manufacturing step of FIG. 4.

The variant illustrated in FIG. 7 differs from what is illustrated in FIG. 4 purely due to the fact that in this variant the gluing device 15 is eliminated and replaced with a gluing device 24 comprising a rocker arm 25, which is mounted to rotate about a rotation axis 26 transverse to the direction 14, and carries connected to the free ends of its arms two matrices 27 having a profile corresponding to the profile of the edge 5.

The profile of each matrix 27 extends along the entire perimeter of the edge 5 and on at least part of the width of the edge 5.

The rocker arm 25 is mounted to rotate intermittently between a pick up station 28, in which one of the matrices 27 is arranged in contact with a pad 29 to pick up the glue, and an application station 30, in which the other matrix 27 is arranged in contact with the edge 5 to release the glue on the edge 5.

Removal of the layer 11 from the edge 5 can be carried out downstream of the forming station of the tray 2 from the sheet and before the tray 2 is filled with the food product or stacked with other trays 2.

Alternatively, after being formed, the trays 2 are firstly stacked to be stored and/or transported, are then unstacked to allow removal of the layer 11 from the edge 5 and application of the layer 16 on the edge 5, and are then stacked once again to be fed to a packaging line, in which the trays 2 are filled with the relative food products and closed with the relative lids 6.

In relation to the above, it should be specified that the layer 16 applied on the edge 5 of each tray 2 is controlled by a control device.

The container 1 has some advantages, mainly deriving from the fact that the layer 11 of non-stick material is removed from the edge 5 before applying the glue layer 16 on the edge 5 so as to prevent even only partial detachment of the glue layer 16 from the edge 5 and ensure correct sealed closing of the tray 2 with the lid 6.

The invention claimed is:

1. A method to manufacture a container for food products, the container including a tray made of a polymer material; wherein the tray has a bottom wall, a side wall, and an upper peripheral edge; the method comprising:
providing a polymer material band delimited by two faces;
providing each face of the polymer material band with a non-stick material which is different from the polymer material of the polymer material band;
obtaining the tray starting from a polymer material sheet cut from the polymer material band;
superficially treating the upper peripheral edge of the tray in order to remove the non-stick material; and
after the superficially treating, applying a glue layer directly on the polymer material of the upper peripheral edge of the tray to lock a closing lid on the upper peripheral edge of the tray.

2. The method of claim 1, wherein applying the glue layer includes applying the glue layer along an entire perimeter of the upper peripheral edge of the tray.

3. The method of claim 1, wherein:
the upper peripheral edge of the tray has a substantially flat shape and a given width; and
wherein applying the glue layer includes applying the glue layer on at least part of the given width of the upper peripheral edge of the tray.

4. The method of claim 1, further comprising removing trays from a stack of trays before superficially treating the upper peripheral edges thereof.

5. The method of claim 1, further comprising stacking the tray after having applied the glue layer on the upper peripheral edge thereof.

6. The method of claim 1, further comprising controlling the glue layer applied on the upper peripheral edge of the tray.

7. The method of claim 1, wherein superficially treating the upper peripheral edge of the tray includes superficially treating the upper peripheral edge of the tray with a laser treatment.

8. The method of claim 1, wherein superficially treating the upper peripheral edge of the tray includes superficially treating the upper peripheral edge of the tray with a plasma or corona discharge treatment.

9. The method of claim 1, wherein superficially treating the upper peripheral edge of the tray includes superficially treating the upper peripheral edge of the tray with a chip-removal machining.

10. The method of claim 1, wherein applying the glue layer includes applying the glue layer along an entire perimeter and on at least part of a width of the upper peripheral edge of the tray by a gluing roller.

11. The method of claim 1, wherein applying the glue layer includes applying the glue layer along an entire perimeter and on at least part of a width of the upper peripheral edge of the tray by a matrix having a profile corresponding to a profile of the upper peripheral edge.

* * * * *